(12) United States Patent
Hei et al.

(10) Patent No.: US 7,789,413 B2
(45) Date of Patent: Sep. 7, 2010

(54) REMOVABLE FLEXIBLE DUAL-OPENING CARRYING BASKET

(75) Inventors: Joseph Hei, Palo Alto, CA (US); Bryan Thomas White, Fremont, CA (US); Hoi Ning Wong, San Mateo, CA (US)

(73) Assignee: Orbit Baby, Inc., Newark, CA (US)

( * ) Notice: Subject to any disclaimer, the term of this patent is extended or adjusted under 35 U.S.C. 154(b) by 766 days.

(21) Appl. No.: 11/540,368

(22) Filed: Sep. 29, 2006

(65) Prior Publication Data

US 2007/0075510 A1     Apr. 5, 2007

Related U.S. Application Data

(60) Provisional application No. 60/722,723, filed on Sep. 30, 2005.

(51) Int. Cl.
*B62B 9/26* (2006.01)

(52) U.S. Cl. .................. 280/642; 280/33.992; 280/650; 280/47.25; 280/47.38; 280/658

(58) Field of Classification Search ............ 280/33.992, 280/47.19, 47.25, 47.38, 304.1, 304.5, 640, 280/642–644, 647, 649, 650, 658; 217/124, 217/125; 224/407, 409, 411, 547, 549
See application file for complete search history.

(56) References Cited

U.S. PATENT DOCUMENTS

| 890,305 | A | * | 6/1908 | Saunders | 217/125 |
|---|---|---|---|---|---|
| 2,565,132 | A | * | 8/1951 | Kantor | 224/572 |
| 2,577,579 | A | * | 12/1951 | Hall | 280/643 |
| 2,689,148 | A | * | 9/1954 | Mcmullin | 296/77.1 |
| 3,558,038 | A | * | 1/1971 | Gelles et al. | 383/15 |
| 3,841,478 | A | * | 10/1974 | Wells et al. | 206/495 |
| 4,103,952 | A | * | 8/1978 | Thompson | 294/1.3 |
| 4,108,468 | A | * | 8/1978 | Orlanski | 280/648 |
| 4,248,364 | A | * | 2/1981 | Anderson | 383/6 |
| 4,449,750 | A | * | 5/1984 | Pultman | 312/235.2 |
| 4,526,419 | A | * | 7/1985 | Bowman et al. | 297/153 |
| 4,707,883 | A | * | 11/1987 | Irani et al. | 16/407 |
| 4,750,783 | A | | 6/1988 | Irby et al. | |
| 4,762,364 | A | | 8/1988 | Young | |

(Continued)

FOREIGN PATENT DOCUMENTS

GB     2207043 A     1/1989

OTHER PUBLICATIONS

U.S. Appl. No. 11/131,662, Joseph Hei, Improvements for Child Restraint Systems, filed May 17, 2005.

(Continued)

*Primary Examiner*—S. Joseph Morano
*Assistant Examiner*—Vaughn T Coolman
(74) *Attorney, Agent, or Firm*—Morrison & Foerster LLP

(57) ABSTRACT

A basket for use alone or in conjunction with a stroller or similar device is provided. The basket is detachable from the stroller and is constructed so that it can be crushable for storage. The basket includes a two-piece handle that, when mated together, can slide into a track of the stroller. The two piece handle separates to open the basket. In a fully open configuration, the basket can lay flat.

15 Claims, 7 Drawing Sheets

U.S. PATENT DOCUMENTS

| | | | | |
|---|---|---|---|---|
| 4,763,919 | A | * | 8/1988 | Nakao et al. ............... 280/644 |
| 4,792,024 | A | * | 12/1988 | Morton et al. ............... 190/1 |
| 4,834,404 | A | | 5/1989 | Wood |
| 4,923,208 | A | * | 5/1990 | Takahashi et al. ........... 280/642 |
| 4,930,697 | A | * | 6/1990 | Takahashi et al. ........... 224/275 |
| 4,936,629 | A | | 6/1990 | Young |
| 4,953,887 | A | * | 9/1990 | Takahashi et al. ........... 280/647 |
| 4,979,657 | A | * | 12/1990 | Espiritu ...................... 224/549 |
| 5,012,963 | A | * | 5/1991 | Rosenbaum ................ 224/407 |
| 5,207,476 | A | | 5/1993 | Payne |
| 5,257,799 | A | * | 11/1993 | Cone et al. .................. 280/642 |
| 5,341,530 | A | | 8/1994 | Ward |
| 5,388,852 | A | * | 2/1995 | Bigo et al. .................. 280/642 |
| 5,462,333 | A | | 10/1995 | Beauvais |
| 5,540,365 | A | | 7/1996 | LaMair |
| 5,562,548 | A | | 10/1996 | Pinch et al. |
| 5,620,069 | A | * | 4/1997 | Hurwitz ...................... 190/107 |
| 5,658,044 | A | | 8/1997 | Krevh |
| 5,659,931 | A | | 8/1997 | Anscher |
| 5,669,624 | A | * | 9/1997 | Eichhorn ..................... 280/642 |
| 5,741,021 | A | * | 4/1998 | Saint et al. ............... 280/47.38 |
| 5,765,855 | A | * | 6/1998 | Chiu .......................... 280/642 |
| 5,775,770 | A | | 7/1998 | Tunney |
| 5,813,092 | A | * | 9/1998 | Greenfield et al. ............ 16/425 |
| D407,311 | S | * | 3/1999 | DuCorday ................... D9/443 |
| 5,908,223 | A | | 6/1999 | Miller |
| 5,961,180 | A | | 10/1999 | Greger et al. |
| 5,971,476 | A | | 10/1999 | Gibson et al. |
| 6,000,753 | A | | 12/1999 | Cone, II |
| 6,017,088 | A | | 1/2000 | Stephens et al. |
| 6,049,954 | A | | 4/2000 | Britto |
| 6,076,485 | A | * | 6/2000 | Peeples et al. ............... 119/497 |
| 6,076,894 | A | | 6/2000 | Busch |
| 6,095,548 | A | * | 8/2000 | Baechler ..................... 280/650 |
| 6,139,046 | A | * | 10/2000 | Aalund et al. ............... 280/642 |
| 6,145,927 | A | | 11/2000 | Lo |
| 6,152,340 | A | * | 11/2000 | Chen et al. .................. 224/409 |
| 6,189,970 | B1 | | 2/2001 | Rosko |
| 6,283,545 | B1 | | 9/2001 | Ernst |
| 6,331,032 | B1 | | 12/2001 | Haut et al. |
| 6,393,677 | B1 | | 5/2002 | Anscher |
| 6,431,647 | B2 | | 8/2002 | Yamazaki |
| 6,508,510 | B2 | | 1/2003 | Yamazaki |
| 6,554,358 | B2 | | 4/2003 | Kain |
| 6,561,577 | B2 | | 5/2003 | Kelly |
| 6,619,734 | B2 | | 9/2003 | Helmsderfer |
| 6,857,700 | B2 | | 2/2005 | Eastman et al. |
| 6,853,345 | B2 | | 3/2005 | Kain |
| 6,899,256 | B2 | * | 5/2005 | Richter ....................... 224/311 |
| 6,938,954 | B1 | | 9/2005 | Hendren et al. |
| 7,011,318 | B2 | * | 3/2006 | Chen ....................... 280/47.38 |
| 7,036,699 | B1 | * | 5/2006 | Hay et al. .................... 224/407 |
| 7,163,265 | B2 | | 1/2007 | Adachi |
| 7,229,083 | B2 | * | 6/2007 | Arai et al. ................ 280/47.38 |
| 7,290,786 | B2 | * | 11/2007 | Cheng et al. ................ 280/647 |
| 7,540,527 | B2 | * | 6/2009 | Willis et al. ................. 280/642 |
| 2001/0022333 | A1 | * | 9/2001 | Banko ........................ 248/100 |
| 2004/0070178 | A1 | * | 4/2004 | Yoshie et al. ............... 280/642 |
| 2005/0092801 | A1 | * | 5/2005 | Hicks et al. ................. 224/547 |
| 2005/0121481 | A1 | * | 6/2005 | Chiu .......................... 224/407 |
| 2005/0121871 | A1 | * | 6/2005 | Arai et al. ................ 280/47.38 |

OTHER PUBLICATIONS

U.S. Appl. No. 11/132,103, Joseph Hei, Modular Child Restraint System, filed May 17, 2005.

U.S. Appl. No. 11/633,943, Joseph Hei, Improvements for Child Restraint Systems, filed Dec. 4, 2006.

U.S. Appl. No. 11/131,568, Joseph Hei, Actively Securable Base for a Modular Child Restraint System, filed May 17, 2005.

* cited by examiner

REMOVABLE FLEXIBLE DUAL-OPENING CARRYING BASKET

CROSS-REFERENCE TO RELATED APPLICATIONS

This application claims the benefit of U.S. Provisional Application No. 60/722,723 filed on Sep. 30, 2005 and titled "Removable Flexible Dual-Opening Carrying Basket," incorporated herein by reference.

BACKGROUND OF THE INVENTION

1. Field of the Invention

The present invention relates generally to the field of child carriers such as strollers and the like, and more particularly to a storage basket for use in combination therewith.

2. Description of the Prior Art

Strollers, carriages, and similar devices commonly include storage in the form of a fixed bag or pouch attached to the underside or back. Such storage can be difficult to access due to the limited size of the opening. Therefore, what is needed is more convenient storage for strollers and the like.

SUMMARY

The present invention provides a stroller comprising a child seat portion, a track disposed beneath the child seat portion, and a carrying basket. The carrying basket includes a handle, comprising two separable pieces, that slidably engages with the track. The carrying basket also includes a fabric pouch suspended beneath the handle. The carrying basket is openable to a flat configuration when disengaged from the track. In some embodiments, the pouch includes two horizontal spars connected to form a hoop, the horizontal spars being detachable from one another to allow the carrying basket to be laid flat. In some embodiments the pouch further includes first and second ends, each end including a separable seam that is closable with a zipper, for example.

The present invention also provides a carrying basket comprising a two-piece handle, a fabric cover including two halves, and a fabric pouch. The two pieces of the handle are configured to mate with one another, and in some embodiments the two pieces of the handle each include a key slot and nub to lock the two together. The handle can also be configured to engage a track. A first half of the cover is coupled to a first piece of the handle and a second half of the cover is coupled to a second piece of the handle. The pouch includes a first side attached to the first half of the cover and a second side, opposite the first side, attached to the second half of the cover, two main horizontal spars attached together to form a hoop around a top of the pouch, and a first end having a first separable seam and a second end, opposite the first end, having a second separable seam. The basket also comprises a pair of vertical spars each extending from the first half of the cover, across a bottom of the pouch, to the second half of the cover. The basket is can be opened to a flat configuration when the two pieces of the handle are detached from one another, the two main horizontal spars are detached from one another, and the two seams are separated.

Another carrying basket of the present invention comprises a fabric piece defining a major symmetry axis and a minor axis perpendicular thereto, which may also be a symmetry axis. The fabric piece includes two opposing sides and a cover flap extending from each along the minor axis, and two opposing ends each including a V-shaped notch, each notch being symmetrically disposed about the major symmetry axis, the sides of each notch including means for joining the sides together in a seam. The basket also comprises two horizontal spars, one attached along each of the two opposing sides, and means for joining the two horizontal spars together to form a hoop, two vertical spars crossing the two horizontal spars and attached to both cover flaps, and a handle piece attached to each of the two horizontal flaps, the two handle pieces configured to mate together to form a handle. The two vertical spars are essentially parallel in some embodiments, and cross each other at the center of the fabric piece in other embodiments. The carrying basket can further comprise a triangular flap that at least partially cover the seam created when the sides of one of the V-shaped notches are joined together.

DETAILED DESCRIPTION OF THE INVENTION

The present invention provides a basket for use alone or with a retaining track that is attached to, or part of, for example, a stroller or similar device. The basket is easily detachable from the stroller and is constructed with fabric with optional semi-rigid spars so that it is crushable for compact storage. The basket also features a two-piece handle. When the two pieces are mated together the handle can slide into a track of the stroller. The two pieces separate to open the basket. Other aspects of the basket allow the basket to open to varying degrees, including laying flat, for varying levels of access. Although illustrated in relation to a stroller in the description below, it will be understood that the baskets of the present invention can be used as luggage or in conjunction with other devices such as rolling carts and bicycles. Baskets of the present invention can also be adapted to attach to more than one type of device.

Figure 1:
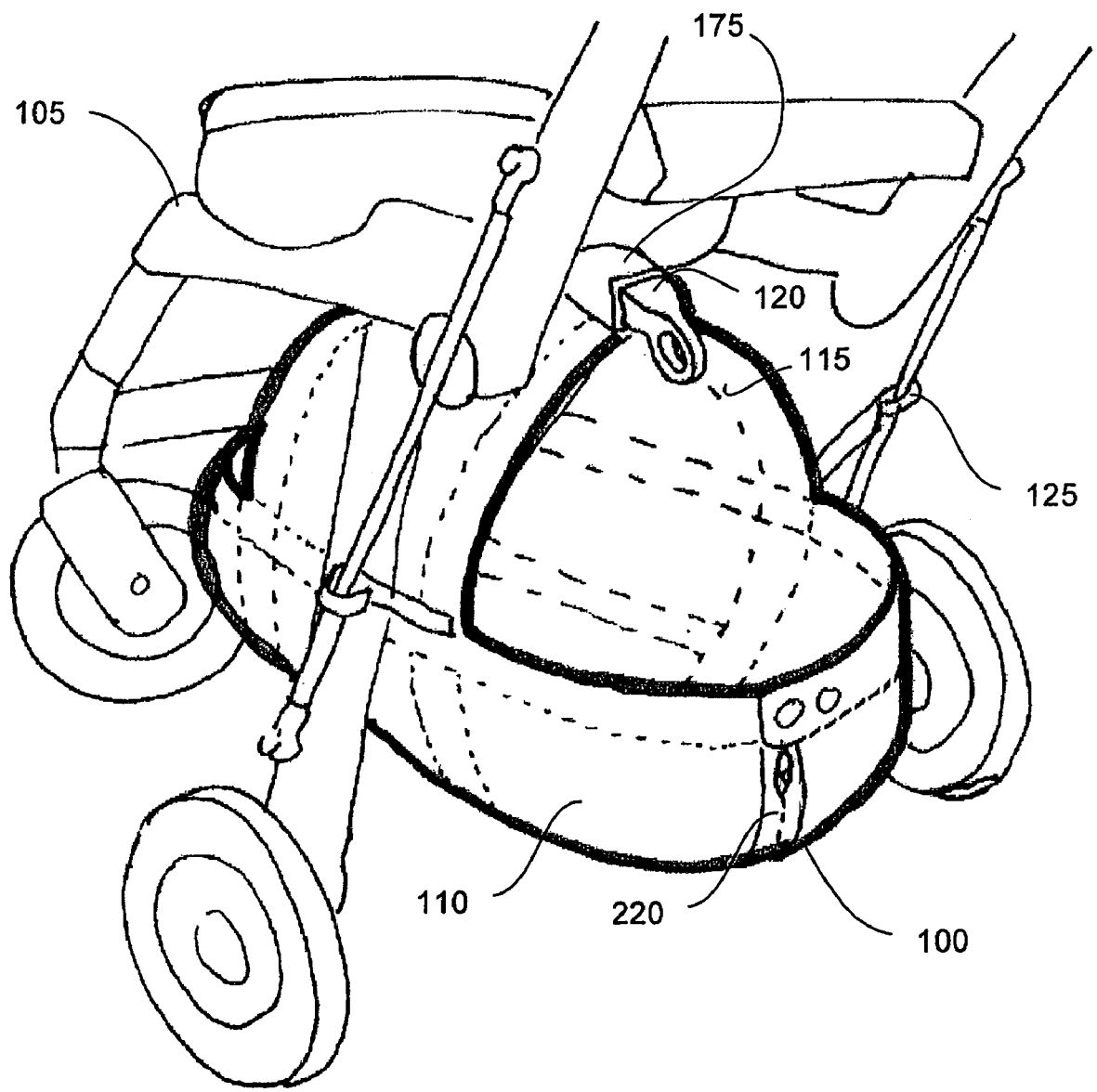
FIG. 1 is a perspective view of a stroller with an exemplary carrying basket according to an embodiment of the present invention.
Figure 2:
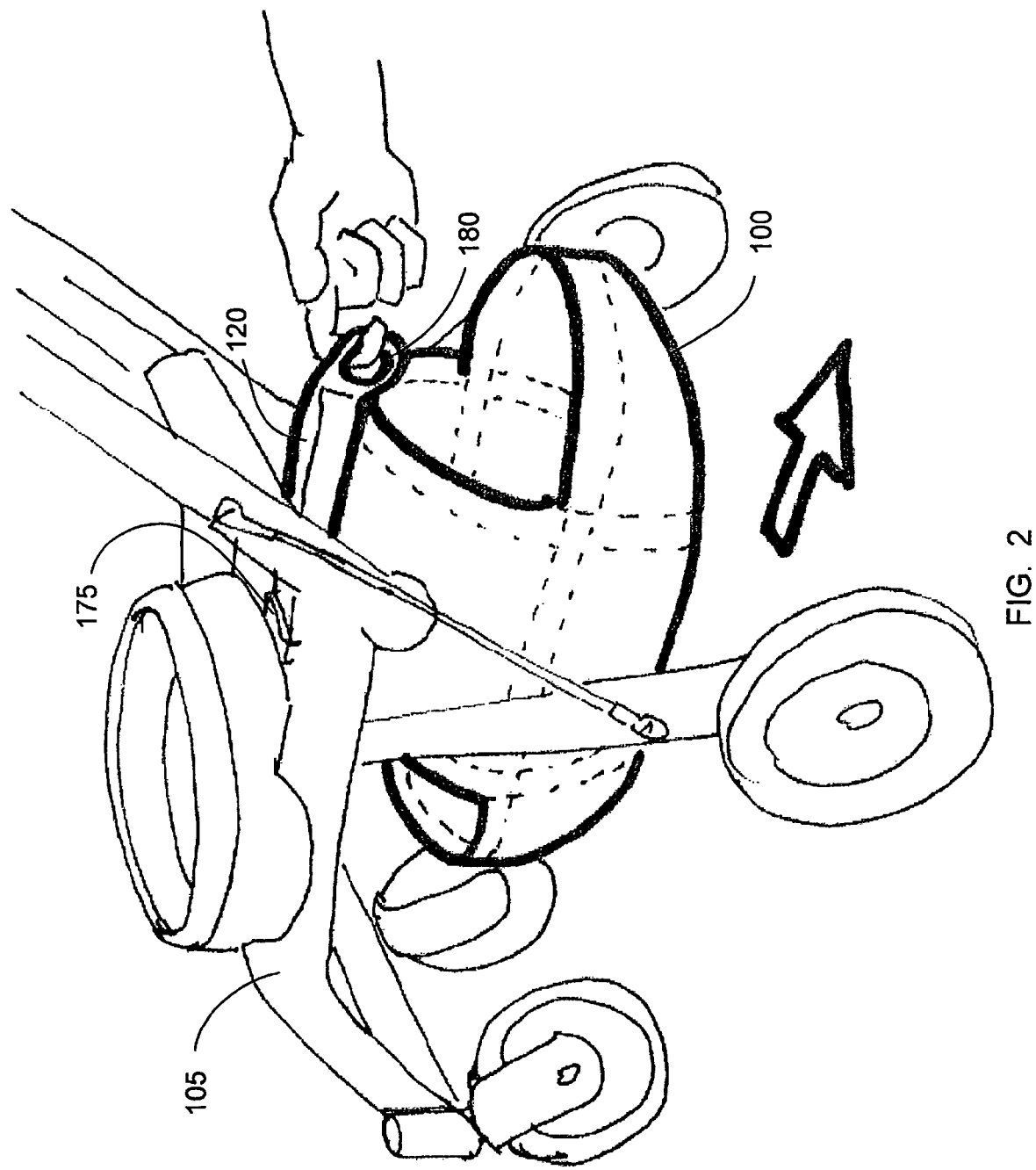
FIG. 2 is a perspective view of the stroller and carrying basket of FIG. 1 with the carrying basket being partially detached from the stroller.
Figure 3:
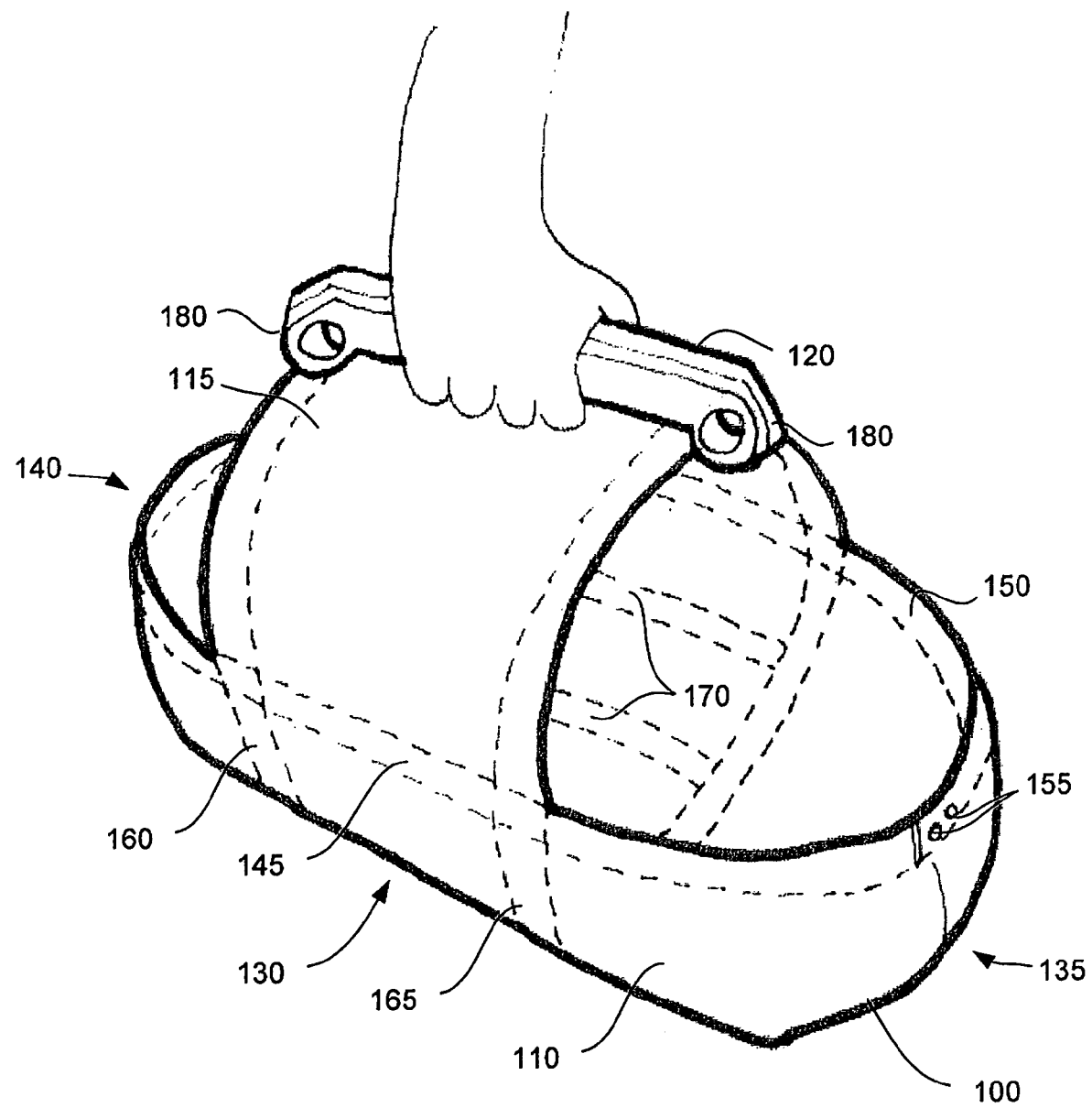
FIG. 3 is a perspective view of the carrying basket of FIG. 1 being carried by hand.

FIG. 1 shows a perspective view of an exemplary basket 100 attached to a stroller 105. FIG. 2 shows the basket 100 partially detached from the stroller 105, and FIG. 3 shows the basket 100 being carried by hand. The basket 100 comprises three main components, a pouch 110, a cover 115, and a handle 120. The pouch 110 provides the carrying space of the basket 100, while the cover 115 provides protection to the contents of the pouch 110 and allows the pouch 110 to be suspended a distance below the handle 120. As discussed below, the handle 120 is separable into two pieces so that the cover 115 can open into two halves, each half attached to an opposite side of the pouch 110.

Also shown in FIG. 1 are two optional hooks 125 that are provided to limit swaying of the basket 100 while the stroller 105 is in motion. The hooks 125 attach to struts of the stroller 105, for example. It will be understood that other attachment means can also be employed in place of the hooks 125, such as Fastex clips, ties, magnets, Velcro, key slots, buttons, and snaps.

With reference to FIG. 3, the pouch 110 is characterized by a rounded bottom 130 and two rounded opposing ends 135, 140. As can be seen, the cover 115 forms an upside-down U-shape. Both the pouch 110 and the cover 115 are made of a fabric such as nylon, cordura, or polyester. Though not shown, either or both of the pouch 110 and the cover 115 can include openings or windows. Windows can be covered with an open mesh, a clear plastic sheet, or the like. Similarly, either or both of the pouch 110 and the cover 115 can include pockets for still further storage.

In the illustrated embodiment, the contours of the pouch 110 and cover 115 are maintained by a number of optional semi-rigid spars that are easily deformable and that will readily spring back to a pre-deformation shape. The spars are shown in dashed lines in the drawings to indicate that in the illustrated embodiments the spars are internal to the fabric of the pouch 110 and cover 115. The dashed lines can also represent stitching in the fabric that creates channels, or pockets, to retain the spars. Suitable materials for the spars include plastic strips, such as nylon strips, and spring steel. In alternative embodiments, the spars are thin rods instead of thin strips.

With continued reference to FIG. 3, the illustrated embodiment includes two main horizontal spars 145, 150 that form a hoop around the top of the pouch 110 when attached together by snaps 155 located at the ends 135, 140 of the pouch 110. Alternatives to snaps 155 can also be used, including Velcro, key slots, screws, clips, magnets, and ties. In the illustrated embodiment two vertical spars 160, 165 are disposed perpendicular to the main horizontal spars 145, 150. The vertical spars 160, 165 are disposed essentially parallel to one another and extend along one side of the cover 115, across the bottom 130 of the pouch 110, and along the other side of the cover 115. In the illustrated embodiment, the vertical spars 160, 165 impart the U-shape to the cover 115 and the rounding to the bottom 130 of the pouch 110. Additional horizontal spars 170 can optionally be used to span the distance between the vertical spars 160, 165 across the bottom 130 of the pouch 110, as shown.

Referring back to FIG. 2, it can be seen that the handle 120 is shaped to engage a track 175 of the stroller 105. The handle 120 is provided with a ring 180 sized to receive a finger to enable a person to easily grasp the handle 120 to disengage the basket 100 from the stroller 105 by sliding the handle 120 out of the track 175. The track 175 is disposed beneath a child seat portion of the stroller 105. It is noted that the stroller 105 shown in FIGS. 1 and 2 includes a hub for receiving a detachable child seat, but that the child seat itself is not shown. As used herein, a "child seat portion" includes both a child seat that is integral to the stroller 105 as well as an engagement mechanism for retaining a detachable child seat, as in the hub of FIGS. 1 and 2.

Figure 4:
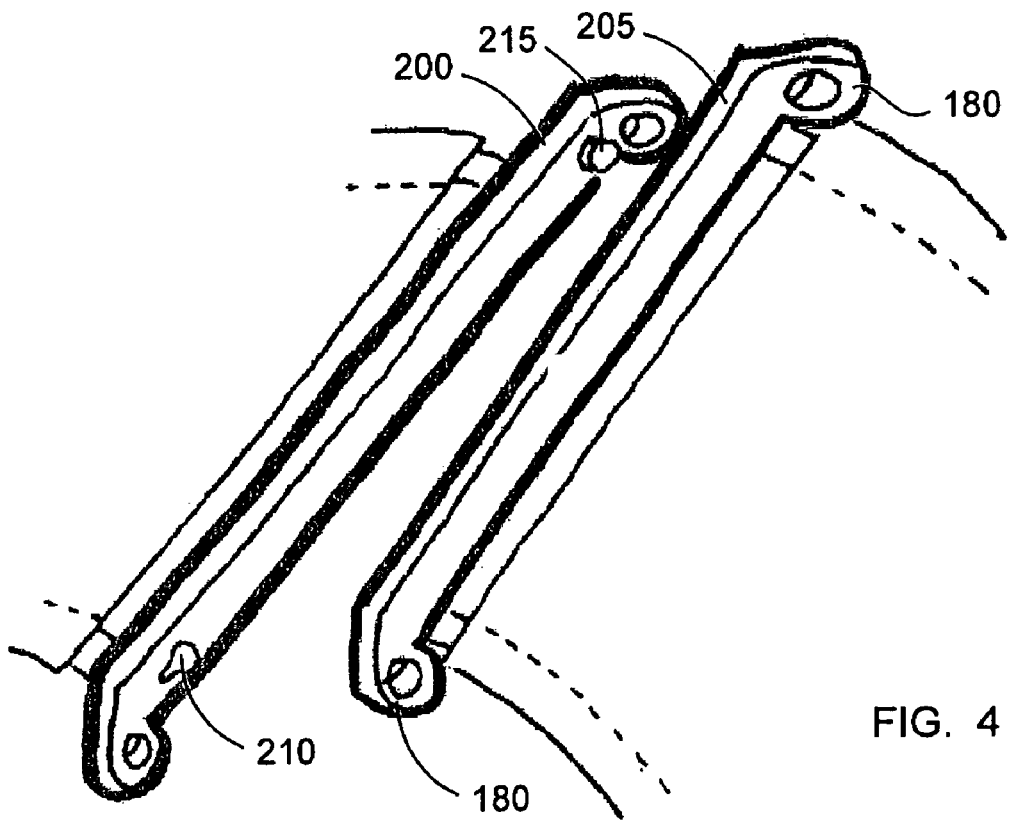
FIG. 4 is a perspective view of an exemplary handle for a carrying basket, the handle comprising two separable pieces, according to an embodiment of the present invention.

FIG. 4 shows a perspective view of two pieces 200, 205 that mate together to form the handle 120 for easy carrying, as in FIG. 3, or come apart to open the cover 115 and provide access to the pouch 110, as further described below. As shown in FIG. 4, the handle 120 can have a ring 180 at either end so that the basket 100 can be suspended from the stroller 105 in either of two orientations. In the embodiment shown in FIG. 4, each piece 200, 205 includes a key slot 210 and nub 215 so that the pieces 200, 205 can engage one another in a locking fashion.

Figure 5:
FIG. 5 is a cross-section taken through the handle of FIG. 4.
Figure 6:
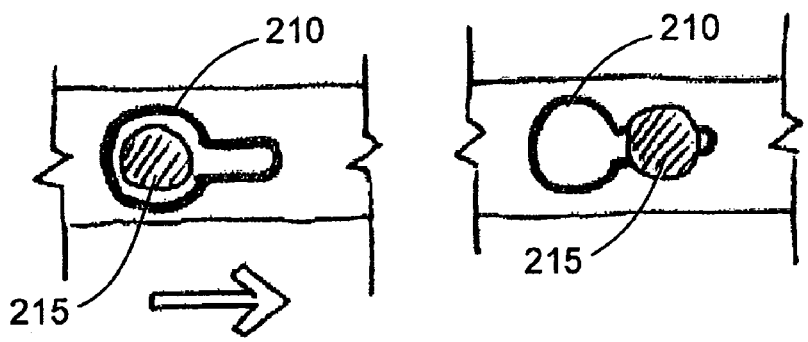
FIG. 6 are two side cut-away views of a nub engaging a key slot in the handle of FIG. 4.

FIG. 5 shows a cross-section taken through the handle 120 to show the two pieces 200, 205 in a locked configuration. FIG. 6 shows a side cut-away view of a nub 215 as first inserted into a key slot 210, and again after the nub 215 has been locked into the key slot 210. It will be appreciated that exemplary alternatives to the key slot 210 and nub 215 engagement mechanism can include the use of Velcro, snaps, hooks, magnets, ties, or clips. While some of these engagement methods lock the pieces 200, 205 together, it will be appreciated that the pieces 200, 205 can also mate together in some embodiments without locking, for example, with the use of a protrusion, such as an alignment pin, on one piece 200 and a matching cavity in the other piece 205.

Figure 7:
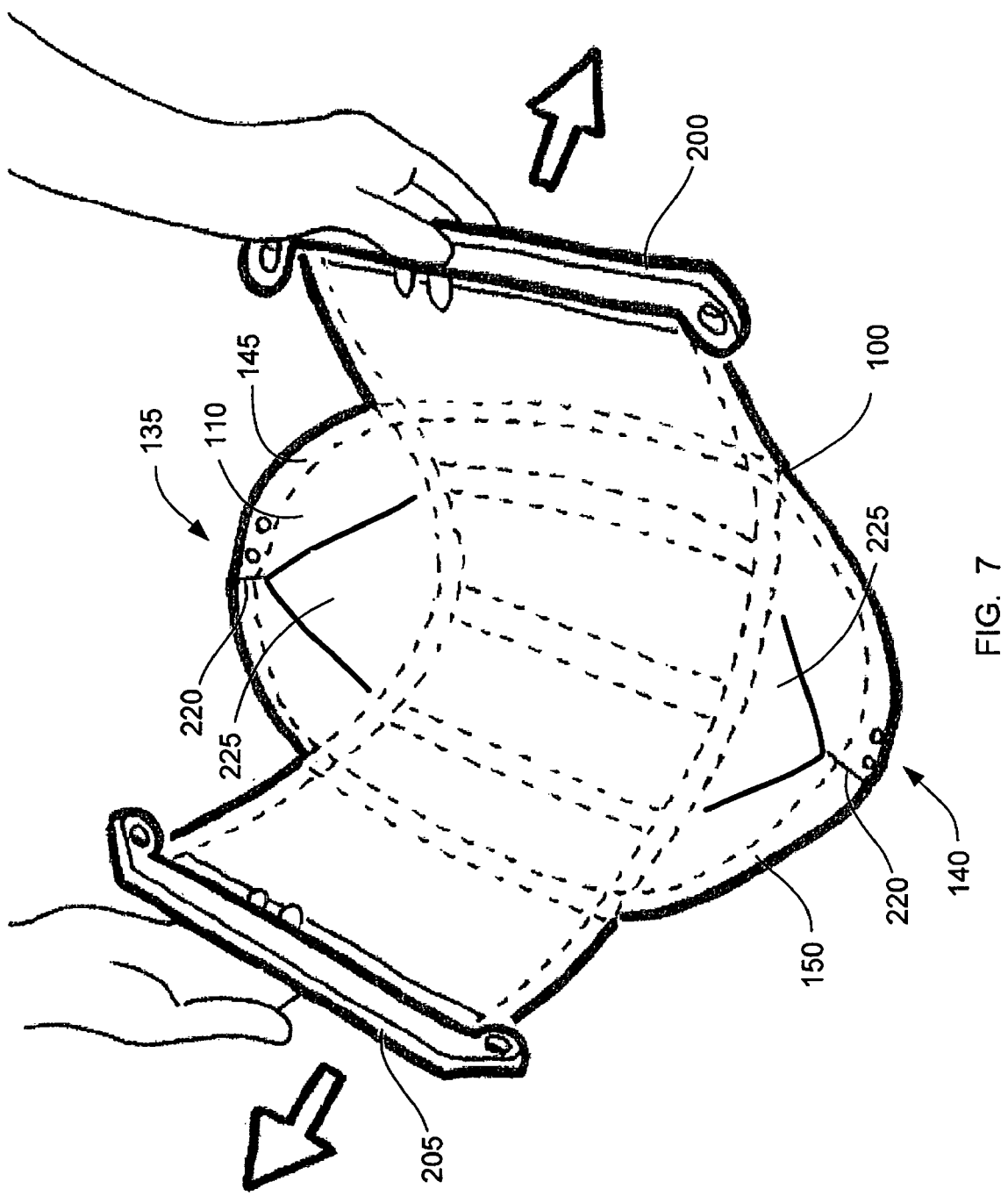
FIG. 7 is a perspective view of the basket of FIG. 1 in a partially open configuration.

FIG. 7 shows a perspective view of the basket 100 in a partially open configuration. Zippers 220 (also shown in FIG. 1) at either end 135, 140 of the pouch 110 are closed, the horizontal spars 145, 150 are joined together, and the handle 120 is separated into the two pieces 200, 205. Also shown in FIG. 7 are two optional generally triangular flaps 225 that substantially cover the zippers 200 on the inside surface of the pouch 110.

Figure 8:
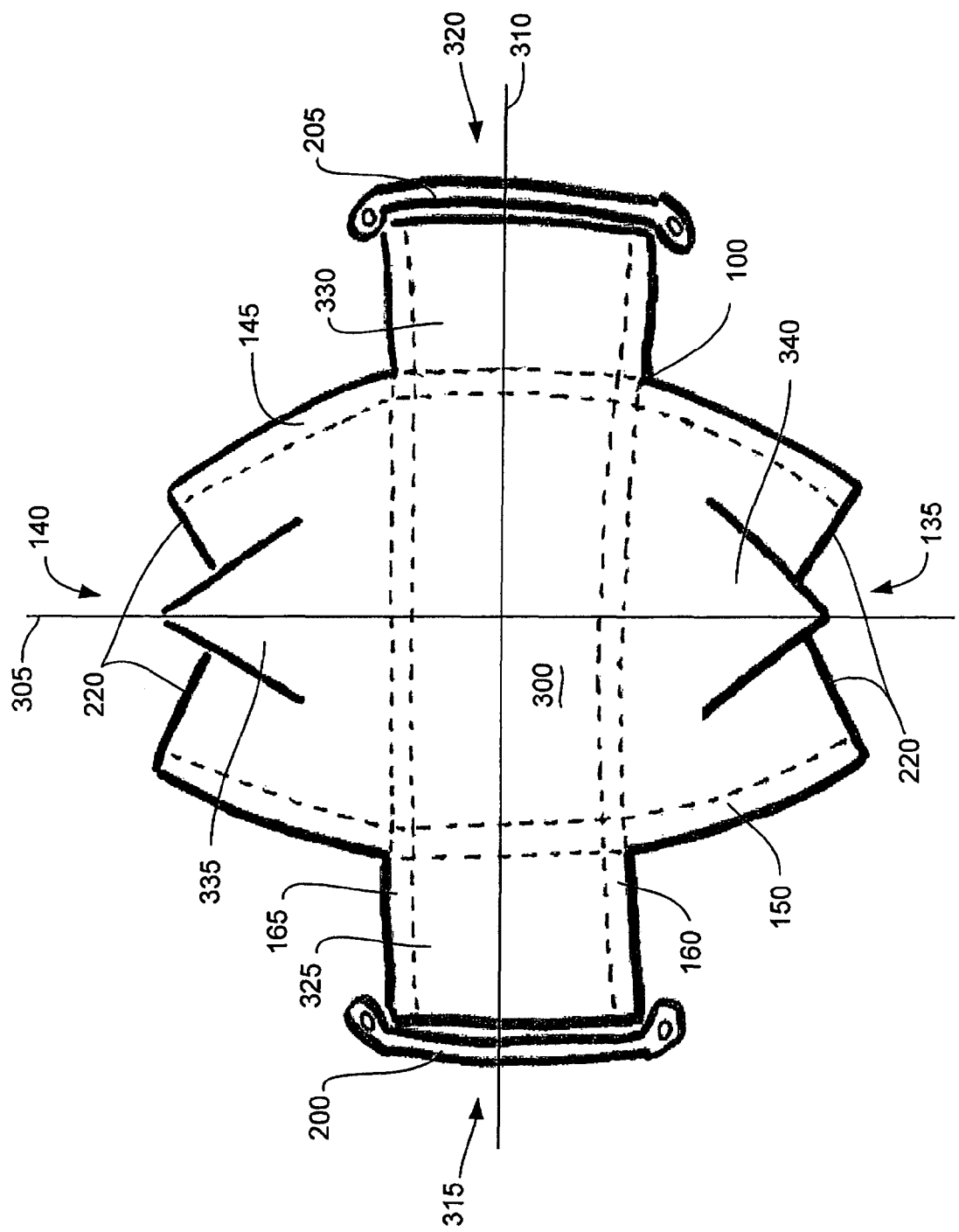
FIG. 8 is a top view of the basket of FIG. 1 laid flat in a fully open configuration.

FIG. 8 shows the basket 100 in a fully open configuration. In FIG. 8 the zippers 220 are open and the horizontal spars 145, 150 are decoupled so that the basket 100 can be laid flat, as shown. It can be, seen particularly well from FIG. 8 that the basket 100 comprises a fabric piece 300 that defines two perpendicular symmetry axes, a major symmetry axis 305 and a minor symmetry axis 310. The fabric piece 300 is mirror symmetric around both axes 305, 310 in this embodiment.

The fabric piece 300 has two opposing sides 315, 320, each having an attached horizontal spar 145, 150. The fabric piece 300 also includes a flap 325, 330 extending from each of the sides 315, 320. The flaps 325, 330 become the halves of the cover 115 when the basket 100 is in the closed configuration. Additionally, a handle piece 345, 350 is coupled to each flap 325, 330 as shown. The handle pieces 200, 205 can be coupled to the flaps 325, 330 in numerous ways. In one example, illustrated in FIG. 7, small fabric tabs can attach the handle pieces 200, 205 to the flaps 325, 330, leaving a narrow gap through which fingers can be inserted. Alternately, small rings can be used in place of the fabric tabs to create the gaps. Other embodiments do not include a gap between the handle pieces 200, 205 and the flaps 325, 330.

It will be understood that some embodiments include only the major symmetry axis 305. Perpendicular to the major symmetry axis 305, in these embodiments, is a minor axis around which the fabric piece 300 is not symmetric. For example, if the cover 115 in FIG. 3 were extended only towards one of the two ends 135, 140, but not towards the other, the resulting basket would have two openings on either side of the cover with one opening larger than the other. In this example, the fabric piece would still be symmetric around the major symmetry axis, but not symmetric around the perpendicular axis. This lesser symmetry can be present, for example, in those embodiments that only engage track 175 in one orientation, rather than the two orientations possible with the embodiment shown in FIG. 3.

The fabric piece 300 also includes two opposing ends 135, 140, each including a V-shaped notch. The sides of the V-shaped notch can be fastened together to form seams when the basket 100 is closed. Suitable fasteners for joining the sides include zippers, Velco, snaps, ties, clips, and buttons. The embodiment of FIG. 8 also includes optional generally triangular flaps 335, 340 at each end 135, 140. When the basket 100 is closed, in these embodiments, the triangular flaps 335, 340 at least partially cover the seams created when the sides of the V-shaped notches are brought together. When the basket 100 is laid flat, the triangular flaps 335, 340 can cover zipper pulls.

The basket 100 also includes two vertical spars 160, 165 that cross the two horizontal spars 145, 150 and are attached to the flaps 325, 330. In the embodiment of FIG. 8 the vertical spars 160, 165 are essentially parallel to one another. As noted above, the handle pieces 200, 205 are coupled to the flaps 325, 330. In some embodiments, the handle pieces 200, 205 are coupled to the flaps 325, 330 by way of the vertical spars 160, 165. The ends of the vertical spars 160, 165 can be integrally formed with the handle pieces 200, 205, for example.

Figure 9:
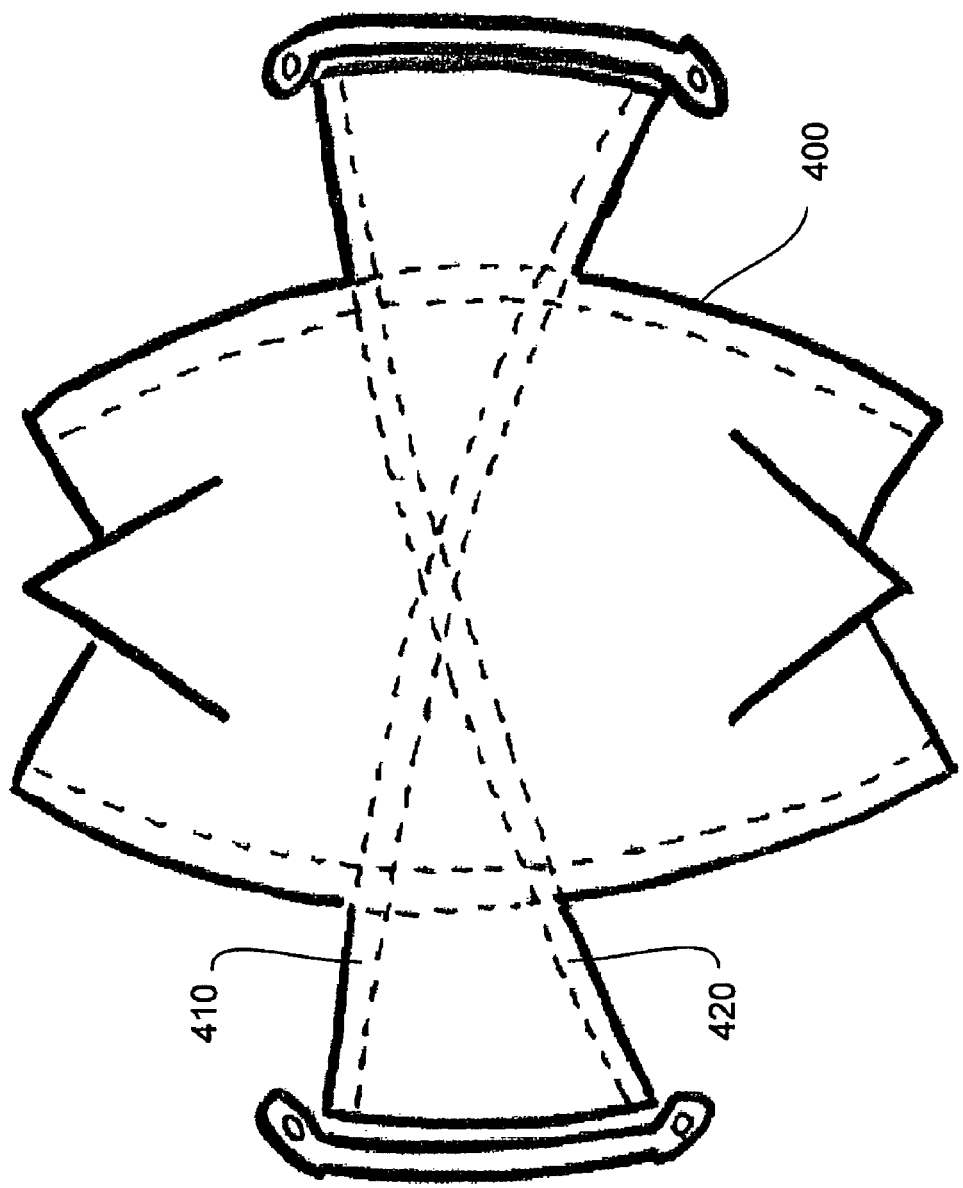
FIG. 9 is a top view of another exemplary basket according to another embodiment of the present invention.

FIG. 9 illustrates another embodiment of the present invention with a different spar configuration than that provided for basket 100. A basket 400 in FIG. 9 differs from the basket 100 of FIG. 8 in that the vertical spars 410, 420 cross each other at the center of the fabric piece 300.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A stroller comprising:
   a child seat portion;
   a track disposed beneath the child seat portion; and
   a carrying basket including
      a handle, comprising two separable pieces operable to mate with each other and slidably engage with the track when mated together, and
      a fabric pouch suspended beneath the handle, the carrying basket being openable to a flat configuration when disengaged from the track, wherein the fabric pouch includes two horizontal spars connected to form a hoop, the horizontal spars being detachable from one another.

2. The stroller of claim 1 wherein the handle includes a first ring disposed at one end thereof, the first ring sized to receive a finger.

3. The stroller of claim 2 wherein the handle further includes a second ring disposed at an opposite end thereof.

4. The stroller of claim 1 wherein the pouch further includes first and second ends, each end including a separable seam.

5. The stroller of claim 4 wherein each separable seam includes a zipper.

6. The stroller of claim 1 wherein the horizontal spars include snaps to connect the horizontal spars together to form the hoop.

7. The stroller of claim 1 wherein the horizontal spars comprise plastic.

8. The stroller of claim 1 wherein the two pieces of the handle are configured to lock together.

9. The stroller of claim 1, wherein the handle is operable to engage a single track, the single track engaging both of the separable pieces of the handle.

10. The stroller of claim 1 wherein the carrying basket further including hooks attached to the stroller.

11. The stroller of claim 1, wherein the handle is operable to engage a single track, the single track centered beneath the child seat portion.

12. A stroller comprising:
   a child seat portion;
   a track disposed beneath the child seat portion; and
   a carrying basket including
      a handle, comprising two separable pieces operable to mate with each other and slidably engage with the track when mated together, wherein the handle includes a first ring disposed at one end thereof, the first ring sized to receive a finger, and
      a fabric pouch suspended beneath the handle, the carrying basket being openable to a flat configuration when disengaged from the track.

13. The stroller of claim 12, wherein the handle further includes a second ring disposed at an opposite end thereof.

14. A stroller comprising:
   a child seat portion;
   a track disposed beneath the child seat portion; and
   a carrying basket including
      a handle, comprising two separable pieces operable to mate with each other and slidably engage with the track when mated together, and
      a fabric pouch suspended beneath the handle, the carrying basket being openable to a flat configuration when disengaged from the track, wherein the pouch further includes first and second ends, each end including a separable seam.

15. The stroller of claim 14, wherein each separable seam includes a zipper.

* * * * *